United States Patent
Urban

(10) Patent No.: US 10,229,399 B2
(45) Date of Patent: Mar. 12, 2019

(54) METHOD AND SYSTEM FOR SECURE ENTRY OF IDENTIFICATION DATA FOR THE AUTHENTICATION OF A TRANSACTION BEING PERFORMED BY MEANS OF A SELF- SERVICE TERMINAL

(71) Applicant: WINCOR NIXDORF INTERNATIONAL GMBH, Paderborn (DE)

(72) Inventor: Patrick Urban, Paderborn (DE)

(73) Assignee: Wincor Nixdorf International GmbH, Paderborn (DE)

( * ) Notice: Subject to any disclaimer, the term of this patent is extended or adjusted under 35 U.S.C. 154(b) by 347 days.

(21) Appl. No.: 14/428,995

(22) PCT Filed: Sep. 5, 2013

(86) PCT No.: PCT/EP2013/068381
§ 371 (c)(1),
(2) Date: Mar. 18, 2015

(87) PCT Pub. No.: WO2014/048693
PCT Pub. Date: Apr. 3, 2014

(65) Prior Publication Data
US 2015/0235190 A1     Aug. 20, 2015

(30) Foreign Application Priority Data
Sep. 26, 2012  (EP) .................................. 12186008

(51) Int. Cl.
*G06Q 20/40*  (2012.01)
*G06Q 20/10*  (2012.01)

(52) U.S. Cl.
CPC ..... *G06Q 20/1085* (2013.01); *G06Q 20/4012* (2013.01); *G06Q 2220/00* (2013.01)

(58) Field of Classification Search
CPC ........... G06Q 20/1085; G06Q 20/4012; G06Q 2220/00
(Continued)

(56) References Cited

U.S. PATENT DOCUMENTS 6,434,702 B1   8/2002   Maddalozzo, Jr. et al.
6,549,194 B1   4/2003   McIntyre et al.
(Continued)

FOREIGN PATENT DOCUMENTS

CN          102184498 A       9/2011
DE       10 2007 043 843      1/2009
(Continued)

OTHER PUBLICATIONS

Chinese Office Action dated Aug. 3, 2016.
(Continued)

*Primary Examiner* — Claude J Brown
(74) *Attorney, Agent, or Firm* — Black, McCuskey, Souers & Arbaugh, LPA

(57) ABSTRACT

A system for authentication and execution of a transaction at a self-service terminal. The system has a first computerized unit (PINSRV) which, in correspondence to a first data set comprising first elements (0, 1, 2, 3, . . . 9) from which the identification data (PIN) are derived, generates a second set of data with second elements (A, B, C, . . . , J), each of which is unambiguously assigned to one of the first elements. A monitor (DISP) is structurally connected to the self-service terminal (ATM) and displays the unambiguous assignment of the second elements to the first elements. A user terminal (MD) is structurally separated from the self-service terminal (ATM), and assigned to a user (CSM) and displaying the second elements (A, B, C, . . . , J) thus to allow the user to enter the input data (#PIN) at the user terminal (MD).

6 Claims, 3 Drawing Sheets

(58) Field of Classification Search
USPC .......................................................... 235/379
See application file for complete search history.

(56) References Cited

U.S. PATENT DOCUMENTS

| | | | | |
|---|---|---|---|---|
| 7,036,016 B1* | 4/2006 | Smith, Jr. | ................. | G09C 1/00 340/5.51 |
| 2002/0029342 A1* | 3/2002 | Keech | .................... | G06Q 20/02 713/184 |
| 2007/0143230 A1* | 6/2007 | Narainsamy | ........... | G06Q 10/10 705/75 |
| 2008/0077798 A1* | 3/2008 | Nachtigall | .............. | G06F 21/31 713/184 |
| 2008/0222048 A1 | 9/2008 | Higgins et al. | | |
| 2010/0242104 A1* | 9/2010 | Wankmueller | .......... | G06F 21/36 726/9 |
| 2011/0191856 A1* | 8/2011 | Keen | ........................ | G06F 21/32 726/26 |
| 2012/0047564 A1 | 2/2012 | Liu | | |
| 2012/0110634 A1* | 5/2012 | Jakobsson | ............... | G06F 21/31 726/1 |
| 2012/0160912 A1 | 6/2012 | Laracey | | |
| 2012/0187187 A1* | 7/2012 | Duff | ................... | G06Q 20/3276 235/382 |
| 2013/0291096 A1* | 10/2013 | Finnan | .................... | G06F 21/31 726/19 |

FOREIGN PATENT DOCUMENTS

| | | |
|---|---|---|
| GB | 2 457 733 | 8/2009 |
| WO | 2004/057516 | 7/2004 |
| WO | 2007/091869 | 8/2007 |

OTHER PUBLICATIONS

English Translation of International Preliminary Report on Patentability for PCT/EP2013/068381.
Written Opinion of the International Searching Authority for PCT/EP2013/068381.
International Search Report dated Feb. 20, 2013.
Chinese Office Action dated Apr. 18, 2017.
Second Examination report for corresponding Australian Application No. 2013323018, 4 pages.

* cited by examiner

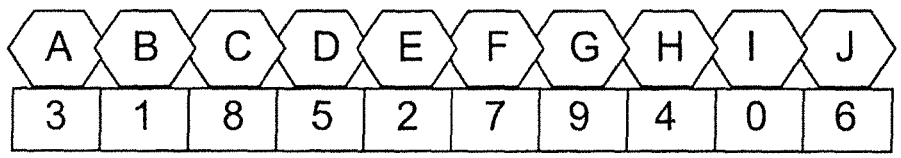
Fig.3
Fig.4a
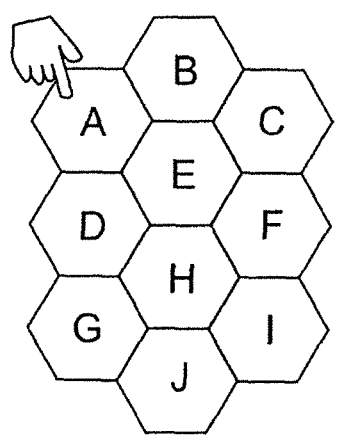 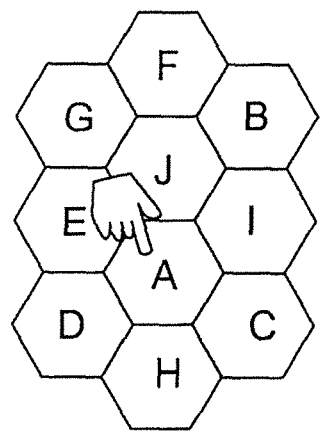
Fig.4b  Fig.4c

METHOD AND SYSTEM FOR SECURE ENTRY OF IDENTIFICATION DATA FOR THE AUTHENTICATION OF A TRANSACTION BEING PERFORMED BY MEANS OF A SELF- SERVICE TERMINAL

BACKGROUND

1. Field of the Invention

The invention relates to a method for secure entry of identification data for authentication of a transaction according to the preamble of method claim 1 and a suitable system for performing the method according to the preamble of the independent device claim.

2. Description of the Related Art

In the field of machine-based payment transactions there are well-known methods and self-service terminals (also referred to as SB terminals). Typical examples of such self-service terminals, to be mentioned, are automated teller machines which are installed in banks, shopping centers etc. installed which allow a user, by using his bank card, to withdraw money from his account at any time and receive it in cash. Also, self-service terminals are known which provide other transactions, such as the transfer of money and/or the deposit of cash. For securing a transaction against abuse there is usually performed an authentication by means of identification data, in particular by means of a so-called PIN (Personal Identification Number) which is assigned to the bank card or which the user has to enter at the automated teller machine correctly. For this feature the prior art automated teller machines or cash machines and other SB terminals comprise a keypad, the so-called EPP (Encrypting PIN Pad), which transmits the entered PIN in encrypted form to the unit(s), in particular to a central server which executes the authentication.

In the past, often emphasis was placed on high-quality components and on comprehensive features in the design of cash machines, which, however, induced higher production costs. Nowadays there is a trend towards cost-effective solutions, particularly for use in developing countries and emerging markets, such as the so-called "BRIC" countries. There are mostly low-cost systems in demand, i.e. self-service terminals which are made as cheaply as possible, but which provide the necessary safety requirements etc. For the manufacturer the production (use of cheaper components, purchasing form cheaper suppliers, optimization of the manufacturing process etc.) often yields only little profit. There is also the risk that product quality, usability and security are affected. Thus alternative solutions are desired which can indeed achieve low production costs, but without having to accept losses in quality, usability and safety. It belongs to the security means that continues to be a secure method of entering identification data for authentication of a transaction can be performed.

In US 2012/0160912 A1 there is disclosed an automated teller machine, also referred to as ATM, which can be operated by means of a mobile user terminal. It is the smartphone of the user or bank customer, being equipped with a camera to scan graphical codes from the monitor of the ATM. Furthermore, a small application (so-called App) is installed on the smartphone, which allows the user, via a mobile communication link to the transaction management system, to execute a transaction at the ATM, without the need to insert the bank card in the card reader of the automated teller machine. The user is authenticated by using his/her smartphone and causes e.g. a cash payment by scanning a barcode that is displayed on the ATM's monitor by means of the smartphone, the barcode being assigned to the transaction and being sent by the smartphone to the transaction management system. This allows the transaction management system not only to check the authentication of the user, but also to detect that the user is currently at that ATM which is involved in the transaction (e.g for cash dispense). Accordingly, the card reader of said known cash machine could be saved in principle. As it is described there in the text section [0049], it may still be necessary for enabling a transaction that the user must enter on the keypad of the ATM or on his smartphone the identification data in form of the so-called PIN (Personal Identification Number). The problem of spying on such sensitive information by third parties is not addressed there.

U.S. Pat. No. 6,549,194 BI describes a method for secure entry of identification data at fixed or mobile terminals. There is described (see FIGS. 2a-d and FIGS. 3a-d) a touch screen, a so-called touch PAD, which has a dynamically changeable layout, in that the spatial distribution of the soft keys on the touch PAD can changed or modified. Accordingly, the layout of the number keys is changed and thus a spying out of the PIN entries is difficult.

U.S. Pat. No. 6,434,702 B1 (FIGS. 1 and 2) also describes a changeable button layout of a keyboard having a number pad, but the layout frame remains fixed and only the order of displayed numbers is changed. The keyboard (pad) shown there may be, for example, the touch pad of an automated teller machine (see text, column 1, lines 29-31).

The following further prior art is to be mentioned: US 2012/047564 A1, WO 2004/057516 A1; DE 10 2007 043843 A1; GB 2457733 A; WO 2007/091869 A2; US 2008/222048 A1.

The object of the invention is to provide a method and a system performing said method, which are suitable for secure entry of identification data for authentication of a transaction that is carried out by means of a self-service terminal, and which hinder the spying of the identification data or at least make it considerably complicate.

SUMMARY OF THE INVENTION

Accordingly, there is disclosed a method for secure entry of identification data for the authentication of a transaction which is performed by means of a self-service terminal, comprising the steps of:

corresponding to a first data set comprising first elements from which the identification data are derived, a second set of data with second elements is generated, each of which is unambiguously assigned to one of the first elements, whereby from the second elements such input data can be generated which represent a bijection of the identification data;

the unambiguous assignment of the second elements to the first elements is displayed on a monitor which is physically connected to the self-service terminal;

at a user-terminal which is physically separated from the self-service terminal and which is assigned with a user of the self-service terminal, the second elements but not the first elements are displayed;

at the user terminal the input data are entered by the user; and the input data are, by means of an application program, transmitted to one or more computerized units being connected to the self-service terminals, wherein said units manage the unambiguous assignment of the second elements to the first elements and perform the authentication of said transaction.

The proposed system is designed for authentication and for performing such a transaction and therefore includes one or more computerized units being connected to the self-service terminal and includes application programs, the system components are, inter alia, the following:

a first computerized unit which, in correspondence to a first data set comprising first elements from which the identification data are derived, generates a second set of data with second elements, each of which is unambiguously assigned to one of the first elements, whereby from the second elements such input data can be generated, which represent a bijection of the identification data;

a monitor being structurally connected to the self-service terminal and displaying the unambiguous assignment of the second elements to the first elements;

a user terminal being structurally separated from the self-service terminal, and being assigned to a user of the self-service terminals and displaying the second elements and not the first element thus to allow the user to enter the input data at the user terminal;

wherein an application program that is implemented on the user terminal transmits the input data to a second computerized unit which performs the authentication of the transaction, and wherein the first computerized unit manages the unambiguous assignment of the second elements to the first elements.

Accordingly, there is no entry of sensitive identification data, for example the PIN, carried out on the user side, i.e. at the user terminal, e.g. Smartphone, and/or at the self-service terminal, but only an entry of input data which represent a bijection of the identification data (PIN), wherein the mapping or unambiguous assignment is securely deposited on the network side only in said computerized unit. For the user, in correspondence to a first data set comprising first elements, such as the numerals from "0" to "9", from which the identification data (PIN) are formed, there is generated a second amount of data with second elements, e.g. with the first ten letters of the alphabet "A, B, C, . . . to J", wherein a one-to-one mapping is built-up. For example, the number "0" is assigned to the letter "I" and the number "1" is assigned the letter "B". This unambiguous assignment is displayed on a screen of the self-service terminal. However, the assignment does not appear on the display or touchpad of the user terminal (smartphone), not even the first elements (numbers "0" to "9") are displayed. Only the second elements, as e.g. the letters "A, B, C, . . . J" are displayed on the smartphone, wherein the arrangement and order can be changed at will. If the user shall enter the identification data or his/her PIN for the transaction, he/she only enters the assigned second elements, such as the letters, i.e. quasi enters a pseudo-PIN (#PIN) which is of no use for a spy or eavesdropper. Since the assignment is only deposited on the network side in the computerized unit, e.g. on a secured server, it is virtually impossible to make a conclusion on the identification data. The invention can do without the need of additional hardware, since conventional system components, such as servers and self-service terminal can be used, wherein only a small software application (known as app) which is in communication with the server, must be running.

Advantageous embodiments of the invention will become apparent from the dependent claims:

Accordingly, it is advantageous when the first elements comprise the values of a numerical keypad and when the second elements include components of a predetermined scheme, in particular, symbols and/or letters of an alphabet, values of a gray scale, coloring of a color gamut and/or positions of a position scheme. Thus, the pseudo-PIN (#PIN) may not contain any numerics or numerical elements. This has the particular advantage that a person spying in even more hindered to perceive the entry of data, because he/she expects an input of numbers and thus does not realize that the user is currently making a data entry that related to the PIN. Moreover, it is rather difficult for a spying person to remember icons/symbols or even gray values. The assignment he/she does not know anyway; so even a successful spying-out the pseudo-PIN cannot lead to success.

Furthermore, it is advantageous when the assignment of the second data set to the first data set is generated by means of a pseudo-random assignment of the second elements to the first elements, in particular is generated again before any execution of a new transaction. As a result, the assignment is changed more frequently and preferably without fixed rules, wherein the assignment might only be valid for the duration of a single transaction.

Preferably the user terminal is a mobile user terminal, in particular a smartphone having a touch-sensitive monitor or touch screen or touch pad, wherein the second elements, in particular being symbols of the predetermined scheme, are displayed on the touch screen, and wherein the input data are entered by the user at the touch screen. The user can thus make directly enter the pseudo-PIN on the touchpad of his/her smartphone, within the displayed scheme.

It is advantageous even if the user terminal has a camera and if for checking whether the user terminal is located near the self-service terminal, to display on the screen a graphical code, in particular a barcode, the graphical code being captured by the camera of the user terminal, especially being scanned; and wherein characteristics of the graphic codes which have been captured by the user terminal are transmitted to one or more computerized units which manage said characteristics of graphic codes and which perform the authentication of the transaction. In this way, it can be securely checked that the user is currently at the self-service terminal at which the transaction (e.g. dispense of cash) shall be executed.

Preferably, the self-service terminal or SB terminal is an automated teller machine, in particular a cash machine that has no keypad to enter the identification data.

The invention and the advantages derived therefrom will now be explained in detail and will be described with reference to the accompanying drawings.

BRIEF DESCRIPTION OF THE DRAWINGS

FIG. 3 shows the assignment being displayed on the screen of a self-service terminal which is a system component of the system of FIG. 1.

FIG. 4a-c show in three variants, an input scheme being displayed on the touch pad of a mobile user terminal which is a system component of the system of FIG. 1.

DETAILED DESCRIPTION

Figure 1:
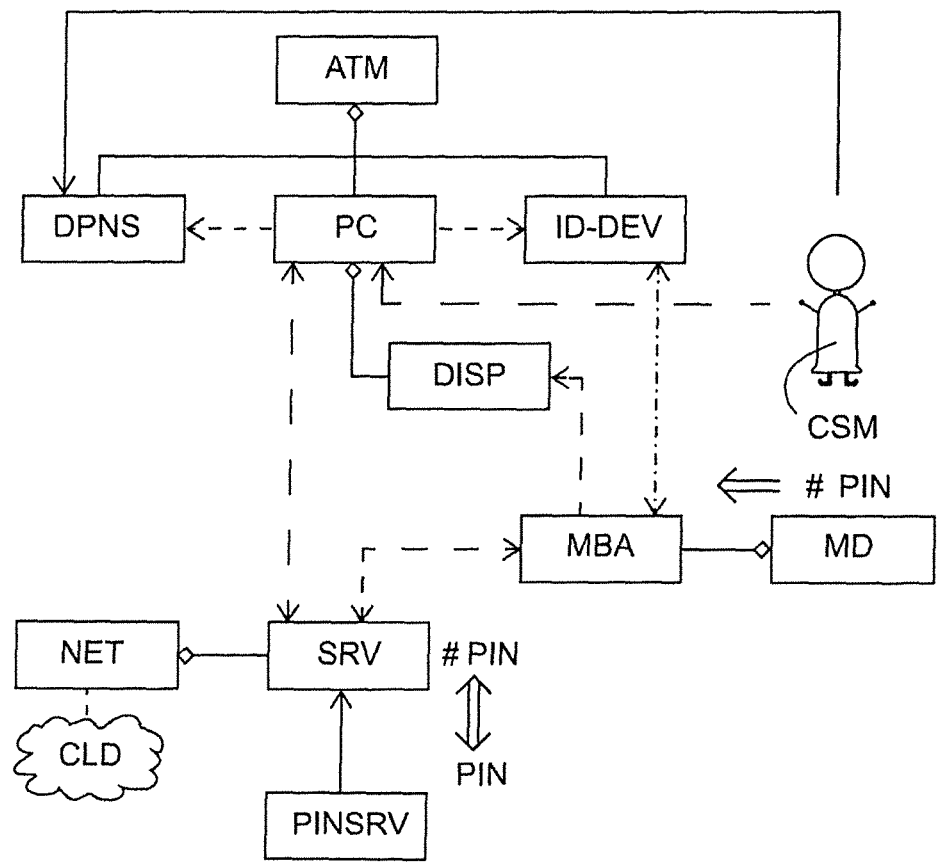
FIG. 1 shows the basic structure of a system according to the invention, in the form of a block diagram.

FIG. 1 shows the basic structure of a system according to the invention for authentication and execution of a transaction on a system's self-service terminal, also referred to as SB terminal. As an example the shown SB terminal is a cash machine ATM which can execute transactions for dispensing cash. In addition, the following components of the cash machine are shown: a cash dispense slot DPNS, an identification device ID DEV, here in the form of a card reader for smartcards, and a monitor or display DISP and a processing unit or computer PC that controls the processes in the cash machine and that communicates with network-side units. The computer and the PC display DISP together form a central unit of the cash machine ATM. The identification device ID-DEV is used here to read customer cards and is therefore part of an additional security channel (Security Channel) which is provided in addition to the PIN entry.

The network-side units of the system include: a central server SRV which is responsible for a large number of cash machines, a PIN server PINSRV that checks the entry of identification data. The server SRV is connected to a server network NET which is responsible for further cash machines and thus can form a so-called cloud CLD.

The user CSM of the cash machine ATM has a mobile user terminal MD, for example a smartphone on which an application MBA is installed to carry out the transaction from his/her smartphone, as described below. This application is hereinafter referred to as Mobile Banking Application MBA and is running on the smartphone of the customer to display the user interface (UI) for said transaction. The cash machine ATM can be located very far away from the server SRV. Overall, the servers and cash machines as well as the mobile user terminals are interconnected via secure (network) channels, such as 3G, 4G, WiFi and WAN connections, each being secured e.g. by SSL or TLS. However, there is no direct network connection between a cash machine ATM and the mobile terminal MD.

Figure 2:
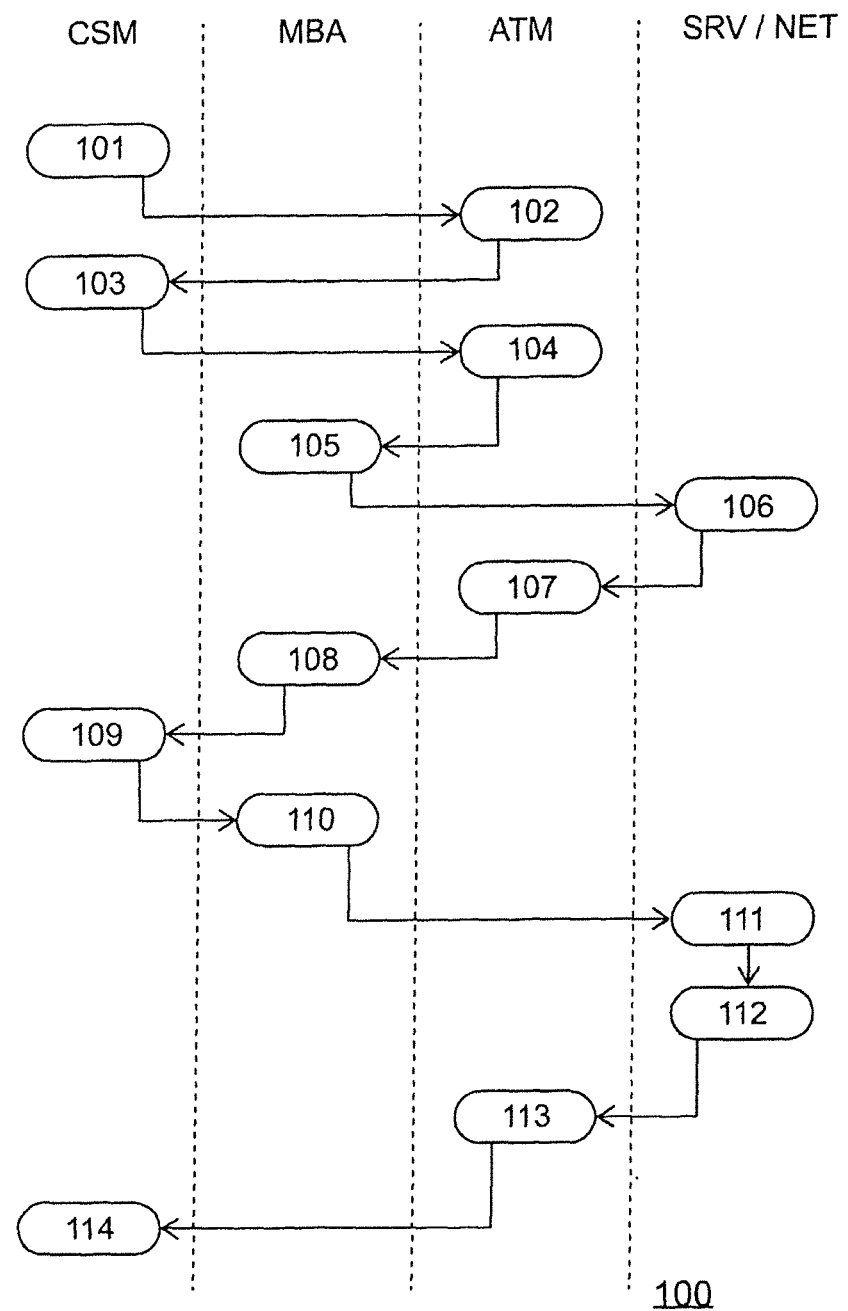
FIG. 2 shows the steps of a method according to the invention, in the form of a flow chart.

The inventive method 100 will be described with reference to FIG. 2, wherein reference is made also to FIG. 1. The steps of the method are arranged in columns and are assigned to the respective system components MBA, ATM and SRV/NET or to the involved user CSM.

In a first step 101, the user CSM causes the start of a new transaction, a cash payment here. Therefore the user or client starts the app MBA on his/her smartphone and logs-in via his/her MBA password, for example, so that the connection to the server will be established.

The cash machine ATM asks in step 102 for identification data which, inter alia, can include the so-called PAN (primary account number) of the customer's bank card. In step 103, the user inserts his bank card into the card reader ID-DEV. Alternatively, he holds up his/her NFC card to the card reader. This step of ID verification via a second safety channel is optional and provides additional security.

The ATM now checks in step 104 whether the user is actually in front of the cash machine. For this purpose, a random number code with several digits is generated by the server and is transmitted to the cash machine ATM which generates a corresponding a graphical code (barcode, QR Code) and displays it on the screen DISP. The customer then holds his/her smartphone MD or its camera to the screen so that that the app MBA can read or scan the barcode by means of the camera and can convert it to the appropriate number code. The app. MBA installed on the user's smartphone scans in step 105 the code from the screen by using the smartphone's camera and sends the result via a mobile communications connection to the server SRV or to the network NET where, in step 106, it is checked whether the result data fits to the displayed. If this is the case, then it is detected that the user is actually located in front of the cash machine. The transaction is then continued. This step is also optional and complies with the safety demands of the bank or of international or country-specific institutions. Potentially it is sufficient to have a chip being installed in the smartphone for NFC (Near Field Communication). Moreover, the generating and scanning of a barcode is only one way of many possibilities. Also graphics being randomly generated, could be used, too. Or the displaying and scanning of graphical codes could be omitted. Instead of this, the data of the customer could be transmitted via the smartphone together or along with a location information (e.g. GPS/GSMIWIFI) to the server in order to check whether the customer is at the location of the cash machine ATM involved.

As to the identity of the server, it is checked by the app MBA e.g. by means of SSL certificate. Alternatively, an optical bar code method, such as described above, can be used. Then, the app would have to scan two bar codes. In this case, both scan operations should be performed in immediate succession. Then they could hardly be noticed by the customer, let alone be distracting. A certificate has the advantage that it is safe from attack by fake ATM along with fake servers.

In the next steps 107-111 the retrieval and secure entry of identification data concerning the PIN are performed. For this purpose, reference is also made to FIGS. 3 and 4a-c:

In step 107, there is displayed on the screen of the cash machine ATM an assignment of the first elements, namely digits 0, 1, 2, ... 9, to the second elements, namely points A, B, C, D ... J, and this is preferably done in a pseudo-random order. For this purpose, the server generates a permutation of the numbers from 0 to 9 and sends it to the cash machine ATM which then displays letters and numbers as shown in FIG. 3. The assignment is only known to the PIN server PINSRV and is neither transmitted through the mobile communication network nor sent throughout other unsafe networks. Within the assignment each letter represents a position information (see FIG. 3). With regard to the numerical arrangement on an EPP this means that each digit is unambiguously assigned to a position or to a letter; for example 5 to D and 4 to position H. The assignment or mapping only appears on the screen of the cash machine ATM for a predetermined period of time so that the user can memorize the assignment or can with the help of said assignment encrypt his/her PIN into letters. For example, the four-digit PIN is as follows "3456". The user recognizes on the basis of the mapping shown in FIG. 3 that the sequence of letters as must be the following: A-H-D-J.

Now in step 108, an input scheme on the touchpad of the smartphone is displayed by means of the app MBA, as shown in FIGS. 4a-c by three examples. Accordingly, neither assignment nor the PIN keypad are displayed, but just an arrangement of the second elements (here the letters), wherein the arrangement can also be generated pseudo-randomly. FIG. 4a shows for a better understanding of the invention no pseudo-random arrangement, but the arrangement of letters corresponding to their alphabetical ranking, i.e. A-B-C-D ... -J.

For retrieving the PIN, the user is prompted in step 109 to enter the appropriate letters on the touchpad of his/her smartphone. In the example here, he/she would enter the letter sequence: A-H-D-J. The app. MBA then sends in step 110, each letter individually or the sends the entire sequence (all four encrypted data) to the server SRV or to the PIN Server. It can then decrypt the encrypted data and can determine what the real PIN is. In step 112, that is, in the course of the actual authentication, then the transaction can be released. The cash machine dispenses the cash in step 113 and the user takes it in step 114 from the cash dispensing drawer.

Instead of a strictly ordered input scheme, as shown in FIG. 4*a*, unordered input schemes or arrangements of the letters can be displayed as this is shown by the examples of the FIGS. 4*b* and 4*c*. The arrangement is preferably generated by a pseudo-random process and is displayed in form of a on-screen keyboard on the touch pad of the smartphone. The generation of on-screen keyboard can be carried out for each new transaction, whereat the large combination possibilities of key arrangements can fully be utilized.

The invention may be realized in particular at self-service terminals where a PIN entry keypad and an EPP special electronics thereof can be omitted. The invention allows a system to perform secure PIN entry by means of the customer's smartphone. It can also be determined with certainty that the smartphone of the customer is actually located in the immediate vicinity of the cash machine ATM. The described method is far less susceptible to manipulation and skimming, as it is the case in the conventional way of entering a PIN via an EPP.

To summarize the above description, for safe entry of a PIN or other identification data there is proposed a dynamically definable assignment or mapping of key positions to key values in the form of a flexible input scheme. For this purpose, a predetermined, preferably pseudo-randomly generated, assignment of key values or numbers in the range of 0-9 to key positions in the form of symbols, letters A, B, C . . . or the like is displayed on the cash machine's screen. However, on the user's smartphone only the key positions, i.e. the symbols, letters or the like, are displayed in the form of an input scheme. The user does not enter his PIN (e.g. "3456"), but instead he/she enters only the assigned key positions ("AHDJ") in accordance with the input scheme. This has the advantage that there is no more PIN input made by the user which could be spied on. It will enter the data (letters) of the assigned key positions ("AHDJ"). The smartphone does not know the PIN, and the cash machine ATM does not know the PIN, but only the scheme. Only the server knows the scheme and the PIN and can release the transaction. This method is therefore very safe.

In other words: each letter represents unambiguously a position information. On the smartphone only position information (letters A-J) is shown, but not the corresponding numerics. Each position information typed by the user is transmitted from the app MBA to the server. Since the server knows the PIN as well as the permutation of the digits 0-9 being transmitted to the cash machine ATM, it can now compare and check whether the customer has entered the correct PIN. The cash machine ATM has no information about the PIN of the customer, only a random permutation was sent to it. The app MBA has only received position information from the customer, but does not have, because lacking of knowledge of the permutation, no possibility to conclude on the appropriate PIN. The PIN is only known by the client and the server! To display the position by means of letters is only one possible way. In the same manner, the position could be displayed, for example, by different graphics, geometric figures or gray scale values.

Since the invention utilizes the smartphone of the user for executing a transaction, components such as the PIN pad/EPP can be omitted at the cash machine ATM.

The reliability of the method can be increased further if required by generating and displaying new permutations for each digit. Here, the permutations are again stored in the server in order to later perform the comparison of the PIN entered by the user with the PIN stored in the server. Since this information is entered via the smartphone of the customer, any skimming is much more difficult to try, because of lacking EPP there is no fixed keypad at the cash machine ATM. Moreover, both the display of the ATM and that of the smartphone including the customer's fingers would have to be "monitored".

Optionally, to check whether the smartphone is close to the operating area of the cash machine ATM, an optically scannable code (barcode/QR code or in general a graphic) are generated and displayed on the screen of the cash machine. Then the scan of the code is performed by using the smartphone and the data is sent to a server which finally compares the data with the code stored in the server. Thus, it can simply be checked that the smartphone is close to the operating area of the cash machine and thus appears to belong to the user.

The invention claimed is:

1. A method for secure entry of identification data (PIN) for the authentication of a transaction which is performed by a self-service terminal (ATM), comprising the following steps:
   corresponding, with a secure server that is a first network-side unit, to a first data set comprising first elements from which the identification data (PIN) are derived, a second set of data with second elements is generated, each of the second elements is unambiguously assigned to one of the first elements, whereby from the second elements such input data (PIN) can be generated which represents a bijection of the identification data (PIN);
   wherein the first elements are selected from the values 0, 1, 2, 3, 4, 5, 6, 7, 8, 9 of a numerical keypad and the second elements are selected from A, B, C, D, E, F, G, H, I, J of a predetermined scheme;
   the unambiguous assignment of the second elements to the first elements is communicated by the secure server over the network-side to the self-service terminal (ATM), is displayed on a monitor (DISP) that is physically connected to the self-service terminal (ATM), and is not communicated out of the network-side;
   wherein the assignment of the second data set to the first data set is generated by a pseudo-random assignment of the second elements to the first elements before any execution of a new transaction;
   displaying at a user terminal (MD) that is physically separated from the self-service terminal (ATM), is not a network-side unit, and that is assigned with a user (CSM) of the self-service terminal (ATM), the second elements but not the first elements whereby the assignment remains deposited only on the network-side;
   entering the input data (#PIN) represented only by second elements by the user (CSM) at the user terminal (MD); and the input data (#PIN), by means of an application program (MBA), transmitting to one or more computerized units (SRV; PINSRV) connected to the self-service terminal (ATM), wherein said units manage the unambiguous assignment of the second elements to the first elements and perform the authentication of said transaction.

2. The method of claim 1, wherein the user terminal is a smart phone (MD), comprising a touch screen, wherein the second elements are displayed on the touch screen, and wherein the input data (#PIN) are entered on the touch screen by the user (CSM).

3. The method of claim 1, wherein the user terminal (MD) comprises a camera and that for checking whether or not the user terminal (MD) is in a vicinity of the self-service terminal (ATM), a graphical code is displayed on the screen (DISP); wherein the graphical code is captured, and scanned, by the camera of the user terminal (MD); and wherein characteristics of the detected graphic codes are transmitted from the user terminal (MD) to one or more of the computerized units (SRV; PINSRV) that are connected to the self-service terminal (ATM) and that manage the characteristics of graphic codes and perform the authentication of the transaction.

4. A system for authenticating and executing a transaction at a self-service terminal (ATM) of the system, wherein for authenticating the transaction by a secure entry of identification data (PIN), the system comprises one or more computerized units (SRV; PINSRV) connected to the self-service terminal (ATM), and comprising the following system components:

a first computerized unit (PINSRV) configured, in correspondence to a first data set comprising first elements from which the identification data (PIN) are derived, to generate a second set of data with second elements, each of which is unambiguously assigned to one of the first elements, whereby, from the second elements such input data (#PIN) can be generated, which represent a bijection of the identification data (PIN);

wherein the first elements are selected from the values 0, 1, 2, 3, 4, 5, 6, 7, 8, 9 of a numerical keypad and the second elements are selected from A, B, C, D, E, F, G, H, I, J of a predetermined scheme;

wherein the assignment of the second data set to the first data set is generated by a pseudo-random assignment of the second elements to the first elements before any execution of a new transaction;

a monitor (DISP) structurally connected to the self-service terminal (ATM) and configured to display the unambiguous assignment of the second elements to the first elements, wherein the first computerized unit (PINSRV) and the self-service terminal (ATM) are network-side units and the unambiguous assignment is retained only on the network-side;

a user terminal (MD) structurally separated from the self-service terminal (ATM) and isolated from the network-side, and assigned to a user (CSM) of the self-service terminal (ATM) and configured to display the second elements and not the first element thus to allow the user (CSM) to enter the input data (#PIN) at the user terminal (MD); and wherein an application program (MBA) that is implemented on the user terminal (MD) is configured to transmit over a mobile network distinct from the network-side the input data (#PIN) to a second computerized unit (SRV) that performs the authentication of the transaction, and wherein the first computerized unit (PINSRV) is configured to manage the unambiguous assignment of the second elements to the first elements.

5. The system of claim 4, wherein the user terminal is a mobile user terminal or a smart phone (MD), comprising a touch panel or touch screen and being configured to display the second elements according to a predetermined scheme, at the touch screen to allow the user (CSM) to enter the input data (#PIN) on the touch screen instead of entering the identification data (PIN).

6. The system of claim 4, wherein the user terminal (MD) comprises a camera and in that, for checking whether the user terminal (MD) is located in the vicinity of the self-service terminal (ATM), the monitor (DISP) of the self-service terminal (ATM) being configured to display a graphical code in that the camera of the user terminal (MD) being configured to capture the graphic code; and the user terminal (MD) is configured to transmit characteristics of the detected graphic codes to one or more of the computerized units (SRV; PINSRV) that are connected to the self-service terminal (ATM) and that is configured to perform the authentication of the transaction and manage the characteristics of graphic codes.

* * * * *